US012737542B2

(12) United States Patent
Ruutu et al.

(10) Patent No.: US 12,737,542 B2
(45) Date of Patent: Sep. 15, 2026

(54) COMPUTER-IMPLEMENTED METHOD FOR OBTAINING AT LEAST ONE NUMBER

(71) Applicant: ELISA OYJ, Helsinki (FI)

(72) Inventors: Ville Ruutu, Helsinki (FI); Jussi Ruutu, Helsinki (FI)

(73) Assignee: ELISA OYJ, Helsinki (FI)

( * ) Notice: Subject to any disclaimer, the term of this patent is extended or adjusted under 35 U.S.C. 154(b) by 134 days.

(21) Appl. No.: 18/850,237

(22) PCT Filed: Apr. 11, 2023

(86) PCT No.: PCT/FI2023/050200
§ 371 (c)(1), (2) Date: Sep. 24, 2024

(87) PCT Pub. No.: WO2023/209273
PCT Pub. Date: Nov. 2, 2023

(65) Prior Publication Data

US 2025/0209268 A1 Jun. 26, 2025

(30) Foreign Application Priority Data

Apr. 27, 2022 (FI) ..................................... 20225352

(51) Int. Cl.
*G06F 40/279* (2020.01)

(52) U.S. Cl.
CPC .................................. *G06F 40/279* (2020.01)

(58) Field of Classification Search
CPC ...... G06F 40/279; G06F 40/10; G06F 40/284; G06F 40/295; G06F 13/1673; G06F 40/205; G10L 15/26
See application file for complete search history.

(56) References Cited

U.S. PATENT DOCUMENTS 5,878,393 A * 3/1999 Hata ........................ G10L 13/07 704/266
6,801,660 B1 * 10/2004 Williamson .......... G06F 40/171 382/229

(Continued)

FOREIGN PATENT DOCUMENTS

| | | | |
|---|---|---|---|
| EP | 1016074 | B1 | 3/2005 |
| EP | 3948853 | A1 | 2/2022 |
| WO | 2020226777 | A1 | 11/2020 |

OTHER PUBLICATIONS

Jiahao Weng: “NLP Text Preprocessing: A Practical Guide and Template I by Jiahao I; Weng I Towards Data Science”, Aug. 30, 2019, URL:https://towardsdatascience.com/nlp-text-preprocessing-a-practical-guide-and-template-d80874676e79 XP093048941.

(Continued)

*Primary Examiner* — Yogeshkumar Patel
(74) *Attorney, Agent, or Firm* — FRESH IP PLC; Michael H. Anderson

(57) ABSTRACT

According to an embodiment, a computer-implemented method for obtaining at least one number based on a word buffer comprises: obtaining a word buffer; filling a number word buffer based on the word buffer by repeatedly obtaining a word from the word buffer, checking whether the word is a number word, and, in response to the word being a number word, adding the word to the number word buffer; in response to at least one preconfigured condition being met, converting the number word buffer into at least one number; and adding the at least one number to a result buffer.

11 Claims, 9 Drawing Sheets

(56) References Cited

U.S. PATENT DOCUMENTS

| | | | | |
|---|---|---|---|---|
| 7,200,555 | B1 * | 4/2007 | Ballard | G10L 15/22 704/E15.04 |
| 8,973,034 | B1 * | 3/2015 | Harvey | H04N 21/6543 725/35 |
| 2005/0240408 | A1 | 10/2005 | Redin | |
| 2018/0130471 | A1 | 5/2018 | Trufinescu | |
| 2021/0043213 | A1 | 2/2021 | Saeki | |

OTHER PUBLICATIONS

Christina Levengood: "Text Normalization for Natural Language Processing in Python", Mar. 22, 2020, URL:https://lvngd.com/blog/text-normalization-natural-language-processing-python/ XP093048917.

Anonymous: "word2number PyPI", Jun. 2, 2017; URL:https://pypi.org/project/word2number/#description XP093048932.

International Search Report and Written Opinion for International Application No. PCT/FI2023/050200, mailing date of Jun. 1, 2023.

Written Opinion of the International Preliminary Examining Authority for International Application No. PCT/FI2023/050200, mailing date of Jan. 10, 2024.

Office Action issued by the Finnish Patent and Registration Office, mailing date of Mar. 12, 2024, FI Application No. 20225352.

Office Action and Search Report issued by the Finnish Patent and Registration Office, mailing date of Nov. 24, 2022, FI Application No. 20225352.

International Preliminary Report on Patentability for International Application No. PCT/FI2023/050200, mailing date of Aug. 2, 2024.

Finnish Patent and Registration Office, Office Action for Finnish Patent Application Application No. 20225352, mailing date of May 19, 2025.

* cited by examiner

201

Obtain audio input

301

Convert audio input into text using speech-to-text

302

COMPUTER-IMPLEMENTED METHOD FOR OBTAINING AT LEAST ONE NUMBER

TECHNICAL FIELD

The present disclosure relates to language processing, and more particularly to a computer-implemented method for obtaining at least one number based on a word buffer, a computing device, and a computer program product.

BACKGROUND

As communication channels digitize, the amount of text-form data increases in the form of, for example, email, chat applications, and social networks. Furthermore, speech-to-text technologies enable the conversion of speech data to text data. These factors also increase the need to process data, such as numerical data, that is in text form.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide a computer-implemented method for obtaining at least one number based on a word buffer, a computing device, and a computer program product. The foregoing and other objectives are achieved by the features of the independent claims. Further implementation forms are apparent from the dependent claims, the description and the figures.

According to a first aspect, a computer-implemented method for obtaining at least one number based on a word buffer comprises: obtaining a word buffer; filling a number word buffer based on the word buffer by repeatedly obtaining a word from the word buffer, checking whether the word is a number word, and, in response to the word being a number word, adding the word to the number word buffer; in response to at least one preconfigured condition being met, converting the number word buffer into at least one number; and adding the at least one number to a result buffer. The method can, for example, efficiently convert number words from the word buffer to at least one number.

In an implementation form of the first aspect, the obtaining the word buffer comprises: obtaining a text input; dividing the text input into individual words; and storing the individual words in the word buffer. The method can, for example, efficiently convert number words from the text input to at least one number.

In another implementation form of the first aspect, the obtaining the text input comprises: obtaining an audio input comprising speech data; and converting the audio input into the text input using a speech-to-text conversion. The method can, for example, efficiently convert number words from the audio input to at least one number.

In another implementation form of the first aspect, the method further comprises: in response to the word not being a number word, checking whether the number word buffer is empty; and in response to the number word buffer being empty, adding the word to the result buffer. The method can, for example, take into account words between number words when converting number words to at least one number.

In another implementation form of the first aspect, the method further comprises: in response to the number word buffer not being empty, checking whether the word is a filler word; and in response to the word being a filler word, discarding the word and proceeding to a next word in the word buffer. The method can, for example, take into account filler words when converting number words to at least one number.

In another implementation form of the first aspect, the method further comprises: in response to the word not being a filler word, converting the number word buffer into at least one number and adding the at least one number to the result buffer.

In another implementation form of the first aspect, the method further comprises: after adding the word to the number word buffer or adding the word to the result buffer, checking whether the word is a last word in the word buffer; and in response to the word being the last word in the word buffer, returning the result buffer. The method can, for example, take into account whether the word is the last word in the word buffer when converting number words to at least one number.

In another implementation form of the first aspect, the method further comprises: in response to the word being the last word in the word buffer, checking whether the number word buffer is empty; and in response to the number word buffer being empty, returning the result buffer. The method can, for example, return the result buffer when the last word in the word buffer is reached.

In another implementation form of the first aspect, the method further comprises: in response to the number word buffer not being empty, converting the number word buffer into at least one number, adding the at least one number to the result buffer, and returning the result buffer. The method can, for example, convert the remaining number words in the number word buffer and return the result buffer when the last word in the word buffer is reached.

According to a second aspect, a computing device comprises at least one processor and at least one memory including computer program code, the at least one memory and the computer program code being configured to, with the at least one processor, cause the computing device to perform the method according to the first aspect.

According to a third aspect, a computer program product comprises program code configured to perform the method according to the first aspect when the computer program product is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
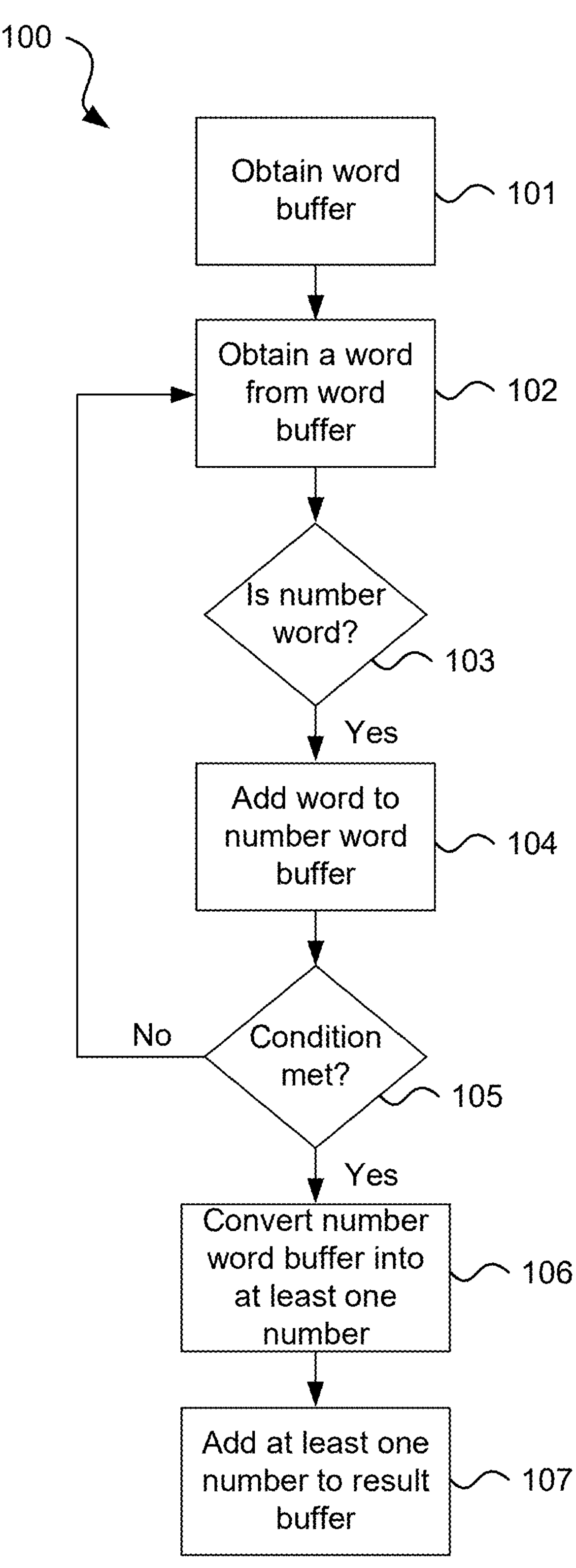
FIG. 1 illustrates a flow chart representation of a method according to an embodiment.

FIG. 1 illustrates a flow chart representation of a method according to an embodiment.

According to an embodiment, a computer-implemented method 100 for obtaining at least one number based on a word buffer comprise obtaining 101 a word buffer.

The method 100 may further comprise filling a number word buffer based on the word buffer by repeatedly obtaining 102 a word from the word buffer, checking 103 whether the word is a number word, and, in response to the word being a number word, adding 104 the word to the number word buffer.

The method 100 may further comprise, in response to at least one preconfigured condition 105 being met, converting 106 the number word buffer into at least one number.

The at least one preconfigured condition 105 may comprise any condition such as those disclosed herein. Further, at least one preconfigured condition 105 may comprise a plurality of condition, such as any combination of those disclosed herein.

The method 100 may repeat the operations 102-104 until the at least one preconfigured condition 105 is met.

The method 100 may further comprise adding 107 the at least one number to a result buffer.

Often it is beneficial to convert number words in a word buffer to numbers while preserving other words in the word buffer. Furthermore, a single number may be represented using a plurality of words in the word buffer. For example, the number 115 may be represented by the words "hundred", "and", and "fifteen", and these three words should typically be converted into a single number instead of converting them into, for example, "100 and 15". Moreover, in many languages, the same number may be represented by a varying number of words and/or, if the word buffer has been generated based on speech, the grouping of the words may vary. Since the method 100 fills the number word buffer by repeatedly obtaining a word from the word buffer, the method 100 can efficiently convert a number represented by a plurality of words into the number.

The method 100 may further comprise, before the operations 101-107, emptying the result buffer and/or emptying the number words buffer.

At least some embodiments can convert number words into numbers the without needing large quantities of processing resources.

At least some embodiments can convert number words into numbers in a fashion that is easy to implement with different technical systems and technologies.

At least some embodiments can convert number words into numbers in a repeatable and coherent manner.

Figures 2, 3:
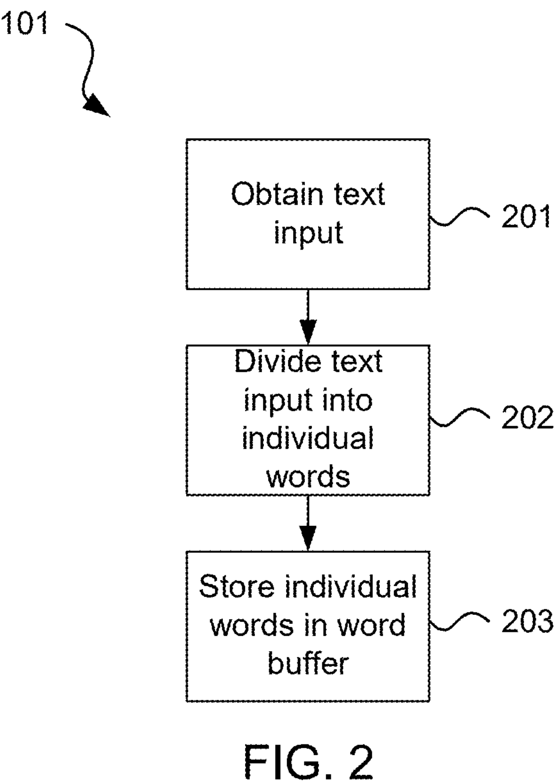
FIG. 2 illustrates a flow chart representation of a method according to another embodiment.
FIG. 3 illustrates a flow chart representation of a method according to another embodiment.

FIG. 2 illustrates a flow chart representation of a method according to another embodiment.

According to an embodiment, the obtaining 101 the word buffer comprises: obtaining 201 a text input, dividing 202 the text input into individual words, and storing 203 the individual words in the word buffer.

FIG. 3 illustrates a flow chart representation of a method according to another embodiment.

According to an embodiment, the obtaining 201 the text input comprises obtaining 301 an audio input comprising speech data; and converting 302 the audio input into the text input using a speech-to-text conversion.

The audio input may also be referred to as audio data, audio information, an audio file, or similar.

The audio input may comprise, for example, a batch of audio as an audio file or a continuous audio stream.

Figure 4:
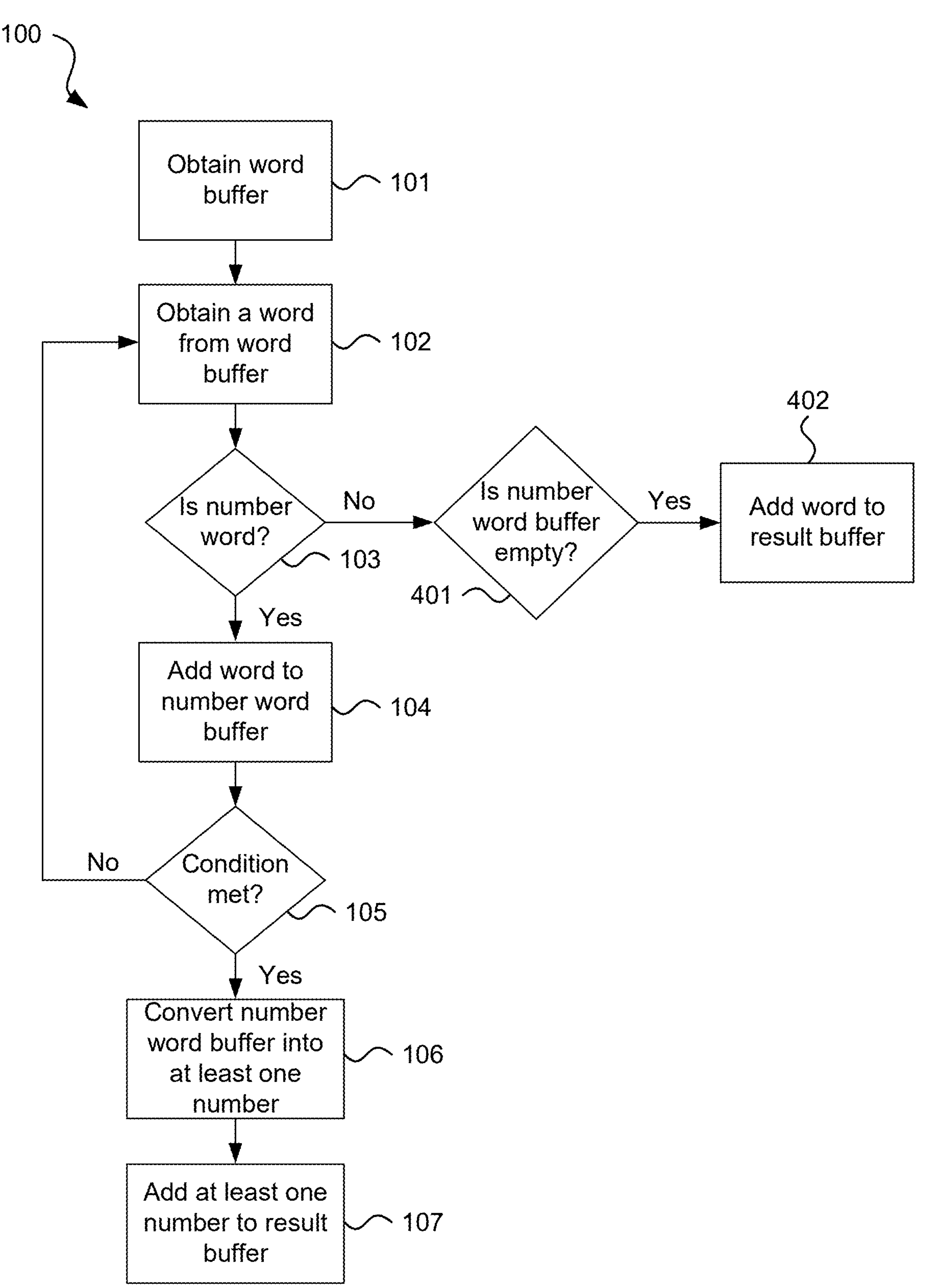
FIG. 4 illustrates a flow chart representation of a method according to another embodiment.

FIG. 4 illustrates a flow chart representation of a method according to another embodiment.

According to an embodiment, the method 100 further comprises, in response to the word not being a number word, checking 401 whether the number word buffer is empty, and in response to the number word buffer being empty, adding 402 the word to the result buffer.

The method 100 may further comprise, after adding 402 the word to the result buffer, proceeding to a next word in the word buffer.

Figure 5:
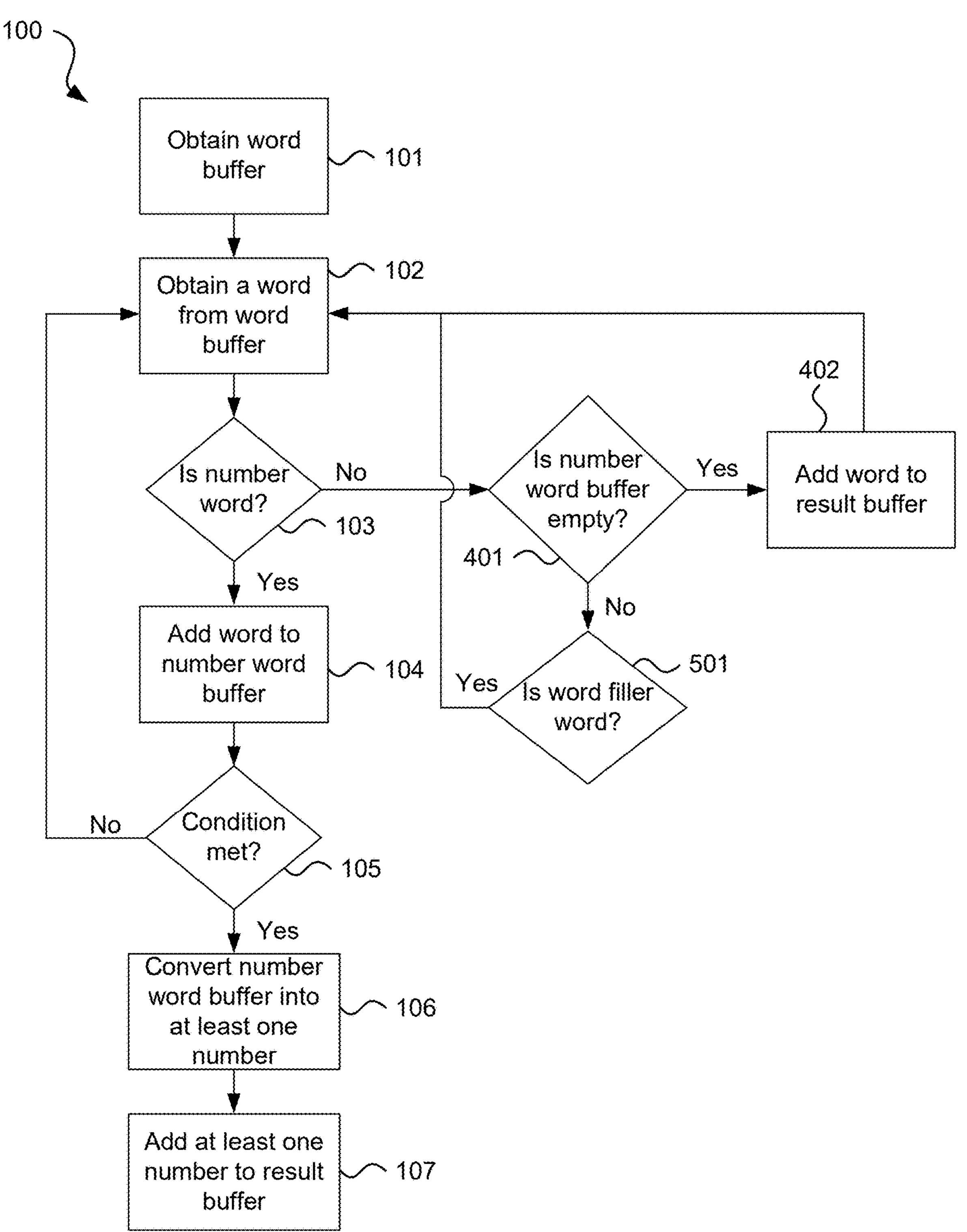
FIG. 5 illustrates a flow chart representation of a method according to another embodiment.

FIG. 5 illustrates a flow chart representation of a method according to another embodiment.

According to an embodiment, the method 100 further comprises, in response to the number word buffer not being empty, checking 501 whether the word is a filler word, and in response to the word being a filler word, discarding the word and proceeding to a next word in the word buffer.

A filler word may refer to, for example, any word or sound that should be ignored. Examples of filler words may comprise "and", "well", and "hmm". For example, if the word buffer comprises the consecutive words "hundred and hmm fifteen", the "hmm" should be ignored before converting the number words into a number. If the word buffer has been generated based on, for example, speech, the word buffer may comprise large numbers of such filler words.

A filler word may be identified by, for example, comparing each word to a database or any other data structure comprising known filler words.

Additionally, there may be other conditions that may be checked before the method 100 proceeds to the next word in the word buffer. Thus, the flow chart illustrated in the embodiment of FIG. 5 is only exemplary. For example, the method 100 may comprise checking, after adding 402 the word to the result buffer, whether the at least one preconfigured condition 105 is met. The at least one preconfigured condition 105 may comprise any one or more conditions, such as those disclosed herein. If the at least one preconfigured condition 105 is not met, the method 100 may proceed to obtaining 102 a new word from the word buffer.

Figure 6:
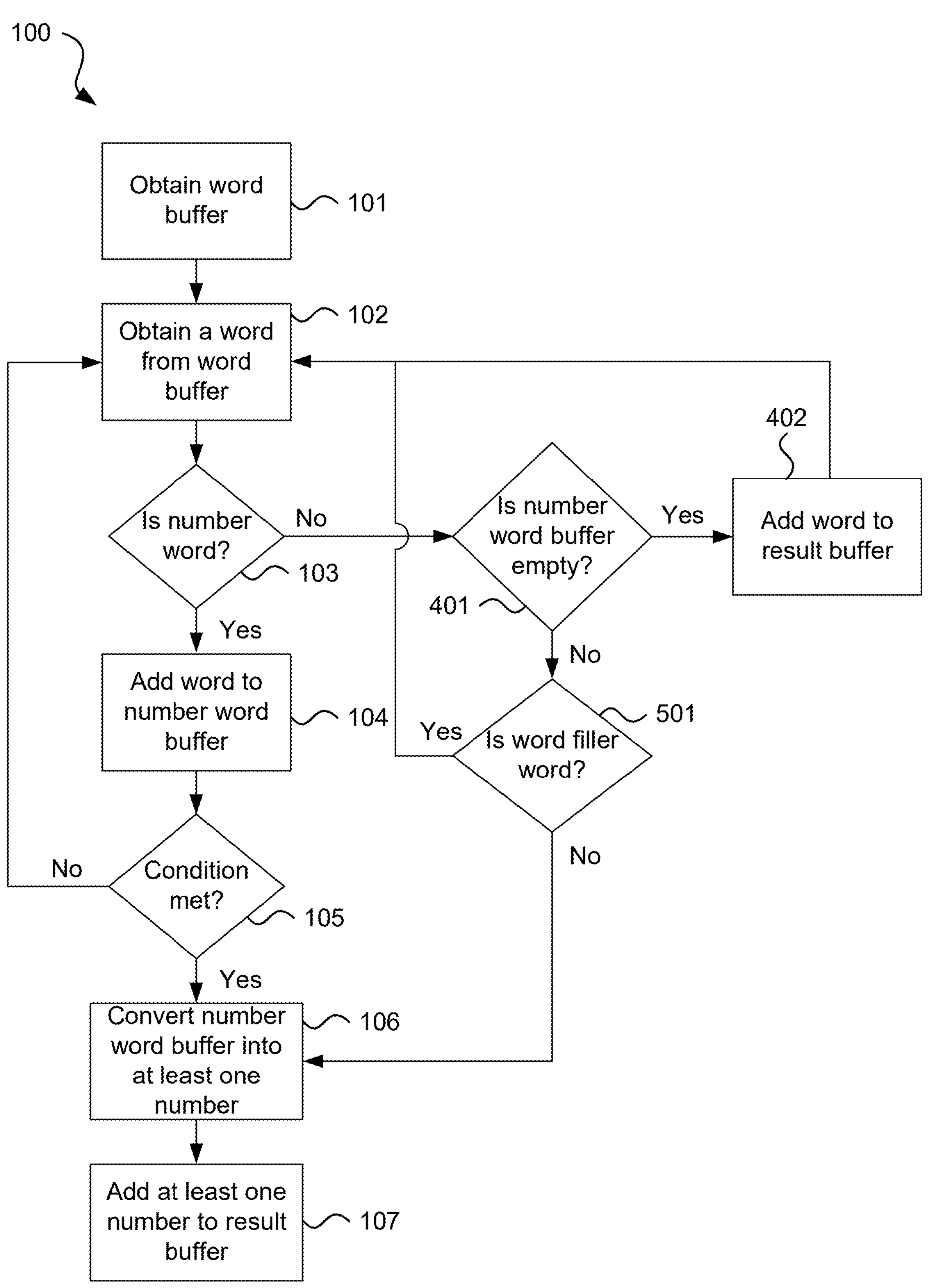
FIG. 6 illustrates a flow chart representation of a method according to another embodiment.

FIG. 6 illustrates a flow chart representation of a method according to another embodiment.

According to an embodiment, the method 100 further comprises, in response to the word not being a filler word, converting 106 the number word buffer into at least one number and adding 107 the at least one number to the result buffer.

In some embodiments, checking 501 whether the word is a filler word can be skipped. Thus, the method 100 may further comprise, in response to the number word buffer not being empty, converting 106 the number word buffer into at least one number and adding 107 the at least one number to the result buffer.

Figure 7:
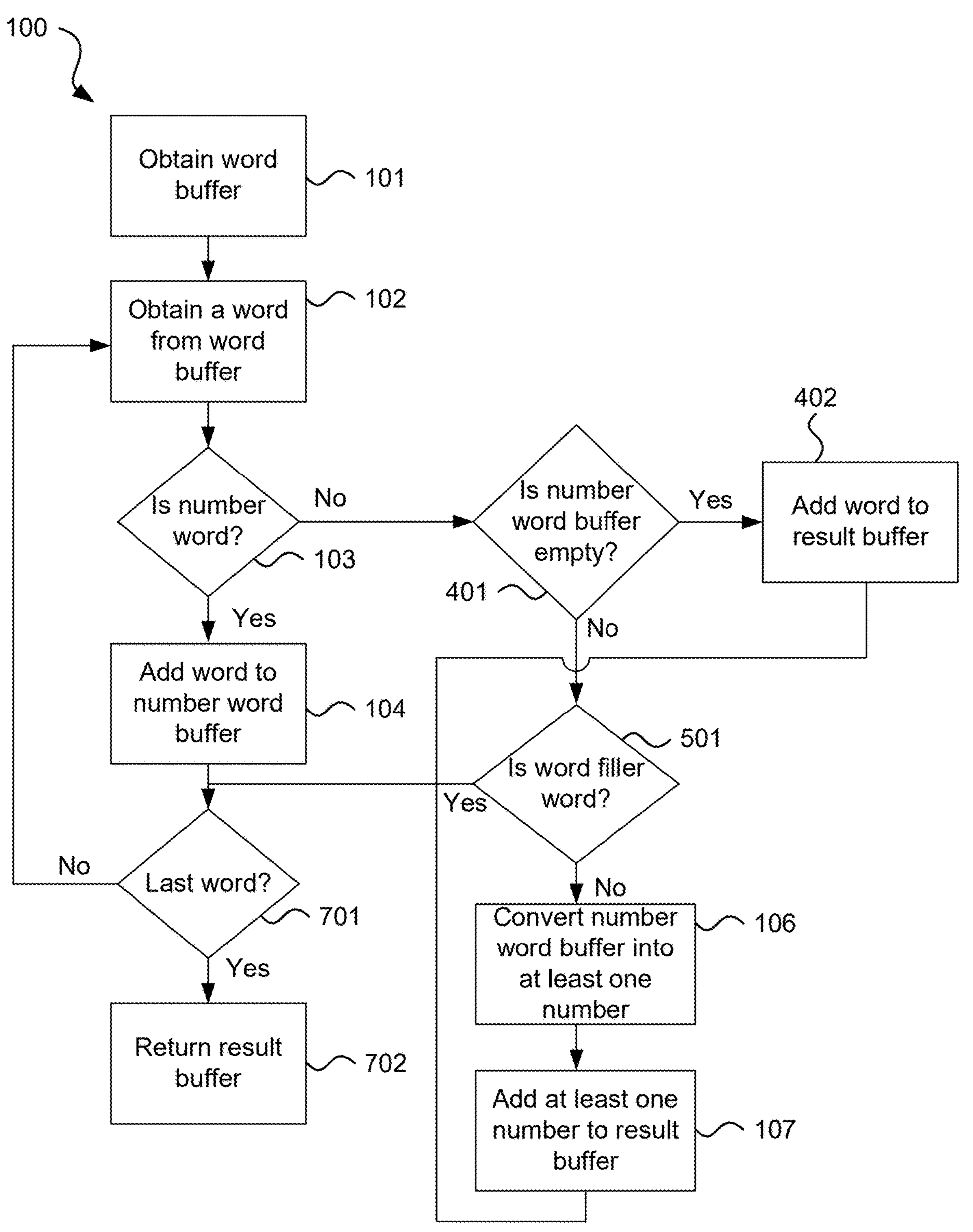
FIG. 7 illustrates a flow chart representation of a method according to another embodiment.

FIG. 7 illustrates a flow chart representation of a method according to another embodiment.

According to an embodiment, the method further comprises, after adding 104 the word to the number word buffer or adding 107 the word to the result buffer, checking 701 whether the word is a last word in the word buffer and, in response to the word being the last word in the word buffer, returning 702 the result buffer.

The returning 702 the result buffer may comprise, for example, providing the result buffer to another module/process. The returning 702 the result buffer may indicate that the method 100 has been completed for the current content of the word buffer.

The check 701 whether the word is the last word in the word buffer can be an example of the at least one preconfigured condition 105.

In some embodiments, such as in the embodiment of FIG. 7, the method 100 may further comprise in response to the word not being a filler word, checking 701 whether the word is a last word in the word buffer and, in response to the word being the last word in the word buffer, returning 702 the result buffer. The method 100 may further comprise, in response to the word not being the last word in the word buffer, obtaining 102 a next word from the word buffer.

The method 100 may further comprise other checks in addition to the check 701 whether the word in the last word in the word buffer and/or other operations before returning 702 the result buffer. Some examples of such checks and/or operations are disclosed in the embodiments herein.

Figure 8:
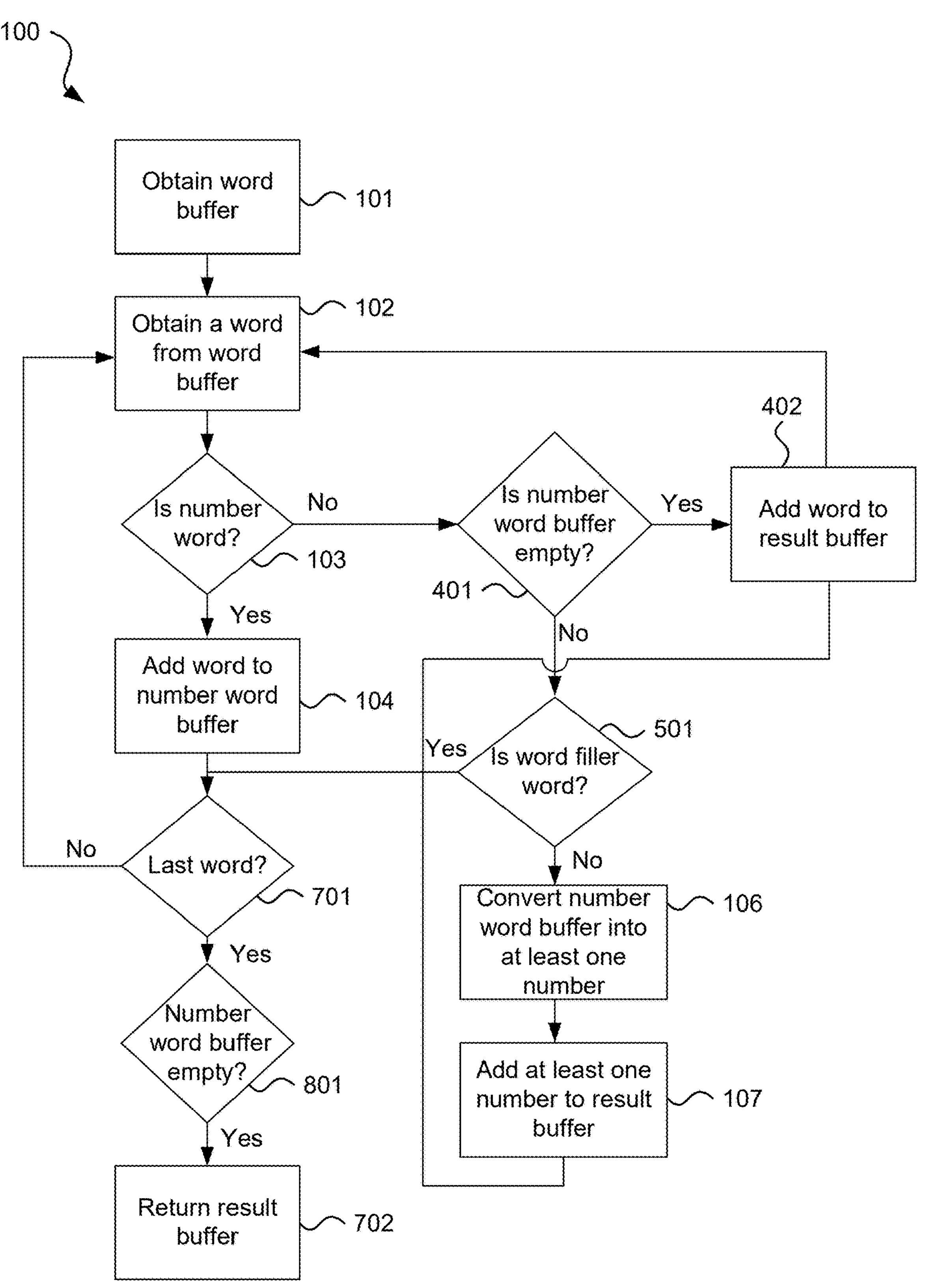
FIG. 8 illustrates a flow chart representation of a method according to another embodiment.

FIG. 8 illustrates a flow chart representation of a method according to another embodiment.

According to an embodiment, the method 100 further comprises, in response to the word being the last word in the word buffer, checking 801 whether the number word buffer is empty, and in response to the number word buffer being empty, returning 702 the result buffer.

The check 801 whether the number word buffer is empty can be a further example of the at least one preconfigured condition 105.

Figure 9:
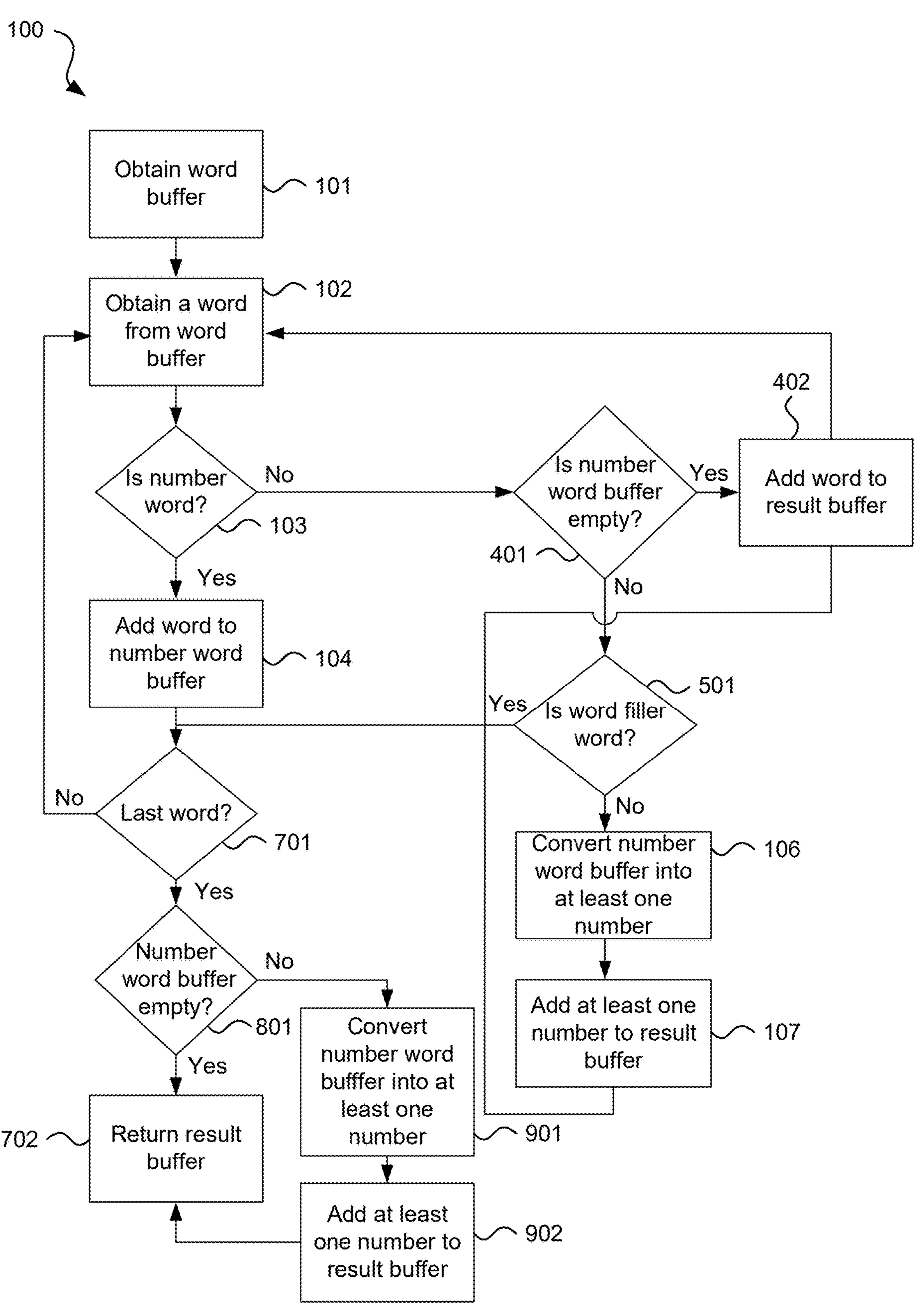
FIG. 9 illustrates a flow chart representation of a method according to another embodiment.

FIG. 9 illustrates a flow chart representation of a method according to another embodiment.

According to an embodiment, the method 100 further comprises, in response to the number word buffer not being empty, converting 901 the number word buffer into at least one number, adding 902 the at least one number to the result buffer, and returning 702 the result buffer.

In some embodiments, the method 100 may be implemented using various modules/components. For example, a text iteration module can iterate through the word buffer word by word and coordinate the processing of the words. Such as iteration module can utilise and communicate with, for example, at least some of the following modules/components. A number word identification module can identify whether a word is a number word or not. A number word converter module can convert number words into numbers. The number word buffer can store the number words. The result buffer can store the resulting text.

Figure 10:
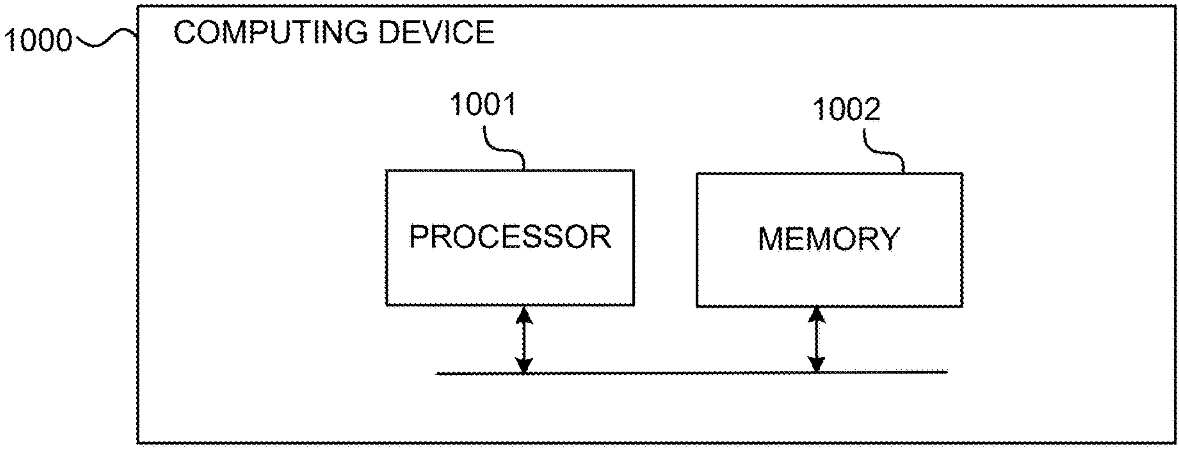
FIG. 10 illustrates a schematic representation of a computing device according to an embodiment.

FIG. 10 illustrates a schematic representation of a computing device according to an embodiment.

According to an embodiment, a computing device 1000 comprising at least one processor and at least one memory including computer program code, the at least one memory and the computer program code configured to, with the at least one processor, cause the computing device to perform the method 100.

The computing device 1000 may comprise at least one processor 1001. The at least one processor 1001 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The computing device 1000 may further comprise a memory 1002. The memory 1002 may be configured to store, for example, computer programs and the like. The memory 1002 may comprise one or more volatile memory devices, one or more non-volatile memory devices, and/or a combination of one or more volatile memory devices and non-volatile memory devices. For example, the memory 1002 may be embodied as magnetic storage devices (such as hard disk drives, magnetic tapes, etc.), optical magnetic storage devices, and semiconductor memories (such as mask ROM, PROM (programmable ROM), EPROM (erasable PROM), flash ROM, RAM (random access memory), etc.).

The computing device 1000 may further comprise other components not illustrated in the embodiment of FIG. 10. The computing device 1000 may comprise, for example, an input/output bus for connecting the computing device 1000 to other devices. Further, a user may control the computing device 1000 via the input/output bus.

When the computing device 1000 is configured to implement some functionality, some component and/or components of the computing device 1000, such as the at least one processor 1001 and/or the memory 1002, may be configured to implement this functionality. Furthermore, when the at least one processor 1001 is configured to implement some functionality, this functionality may be implemented using program code comprised, for example, in the memory.

The computing device 1000 may be implemented at least partially using, for example, a computer, some other computing device, or similar.

The method 100 and/or the computing device 1000 may be utilised in, for example, automatic speech recognition (ASR) application such as in a so-called voicebot. A voicebot may be configured to obtain information from users by, for example, phone and convert the voice information into text information using ASR. The method 100 may be used to convert number words in the text into numbers. The voicebot may further be configured to further process, such as classify, the text information. The voicebot can, for example, ask questions about, for example, basic information from a customer in a customer service situation over the phone, obtain the answers using ASR and the method 100, and save the information in a system. Thus, the customer service situation can be made more efficient and user experience can be improved.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method for obtaining at least one number based on a word buffer, the method comprising:

obtaining a word buffer;

filling a number word buffer based on the word buffer by repeatedly obtaining a word from the word buffer, checking whether the word is a number word, and, in response to the word being a number word, adding the word to the number word buffer;

in response to at least one preconfigured condition being met, converting the number word buffer into at least one number; and adding the at least one number to a result buffer.

2. The computer-implemented method according to claim 1, wherein the obtaining the word buffer comprises:

obtaining a text input;

dividing the text input into individual words; and storing the individual words in the word buffer.

3. The computer-implemented method according to claim 2, wherein the obtaining the text input comprises:

obtaining an audio input comprising speech data; and converting the audio input into the text input using a speech-to-text conversion.

4. The computer-implemented method according to claim 1, the method further comprising:

in response to the word not being a number word, checking whether the number word buffer is empty; and in response to the number word buffer being empty, adding the word to the result buffer.

5. The computer-implemented method according to claim 4, the method further comprising:

in response to the number word buffer not being empty, checking whether the word is a filler word; and in response to the word being a filler word, discarding the word and proceeding to a next word in the word buffer.

6. The computer-implemented method according to claim 5, the method further comprising:

in response to the word not being a filler word, converting the number word buffer into at least one number and adding the at least one number to the result buffer.

7. The computer-implemented method according to claim 1, the method further comprising:

after adding the word to the number word buffer or adding the word to the result buffer, checking whether the word is a last word in the word buffer; and in response to the word being the last word in the word buffer, returning the result buffer.

8. The computer-implemented method according to claim 7, the method further comprising:

in response to the word being the last word in the word buffer, checking whether the number word buffer is empty; and in response to the number word buffer being empty, returning the result buffer.

9. The computer-implemented method according to claim 8, the method further comprising:

in response to the number word buffer not being empty, converting the number word buffer into at least one number, adding the at least one number to the result buffer, and returning the result buffer.

10. A computing device, comprising at least one processor and at least one memory including computer program code, the at least one memory and the computer program code configured to, with the at least one processor, cause the computing device to perform the method according to claim 1.

11. A non-transitory computer-readable storage medium having instructions stored thereon that, when executed by a computing device, cause the computing device to perform the method according to claim 1.

* * * * *